(12) United States Patent
Norris et al.

(10) Patent No.: US 6,490,529 B1
(45) Date of Patent: Dec. 3, 2002

(54) METHOD FOR CUSTOMIZING SEISMIC EXPLOSIVES

(75) Inventors: Michael W. Norris, Cypress; Douglas L. Bremner; Thomas J. Fleure, both of Houston, all of TX (US)

(73) Assignee: Westerngeco, L.L.C., Houston, TX (US)

( * ) Notice: Subject to any disclaimer, the term of this patent is extended or adjusted under 35 U.S.C. 154(b) by 65 days.

(21) Appl. No.: 09/703,226

(22) Filed: Oct. 30, 2000

(51) Int. Cl.[7] .................................................. G01V 1/28
(52) U.S. Cl. ............................................................ 702/17
(58) Field of Search .............................. 702/14, 17, 6; 703/2, 5, 6; 181/116; 367/73, 13, 14, 54, 46

(56) References Cited

U.S. PATENT DOCUMENTS

| | | | |
|---|---|---|---|
| 3,886,493 A | * 5/1975 | Farr | 367/189 |
| 4,217,571 A | 8/1980 | Hughes et al. | 367/37 |
| 4,497,044 A | 1/1985 | Silverman | 367/41 |
| 4,725,991 A | 2/1988 | Crenwelge, Jr. et al. | 367/23 |
| 5,253,217 A | * 10/1993 | Justice et al. | 702/17 |

FOREIGN PATENT DOCUMENTS

GB 1091889 11/1967

OTHER PUBLICATIONS

PCT International Search Report dated Aug. 1, 2002 (PCT/US 01/48048).

* cited by examiner

Primary Examiner—Donald E. McElheny, Jr.
(74) Attorney, Agent, or Firm—David S. Figatner; Williams, Morgan & Amerson, P.C.

(57) ABSTRACT

A method for identifying optimal seismic energy source configurations for a selected seismic survey area. Physical properties of the surface or near-surface soil or rock are assessed and are tested to determine the response of such soil to energy source characteristics and geometries. A test model for a source is generated and is projected to create a far-field seismic response model. A seismic event is initiated within the survey area to measure seismic data, and such measured data is compared against the far-field seismic response model. Differences can be assessed to permit modifications to the model, and the model can be tested for different types and configurations of seismic source energy sources.

20 Claims, 2 Drawing Sheets

METHOD FOR CUSTOMIZING SEISMIC EXPLOSIVES

BACKGROUND OF THE INVENTION

The present invention relates to the field of seismic exploration. More particularly, the invention relates to a method for determining optimal explosive characteristics for specific seismic survey conditions.

Holes are drilled in rock for excavation blasting, mining operations, and many other purposes. For example, explorative searches for hydrocarbons, minerals, and other products require the physical penetration of geologic formations. Seismic operations typically detonate explosive charges to generate shock wave source signals for penetrating subsurface geologic formations. The shock waves are reflected from subsurface geologic structures and interfaces and the reflected energy is detected with sensors such as geophones at the surface. These transducers reduce the reflected energy into signals which are recorded for processing.

In many land-based geophysical seismic operations, vibrator trucks contact the soil and discharge energy into subsurface geologic formations. However, survey regions frequently comprise mountainous, tropical, or other regions inaccessible to seismic trucks. Because of accessibility constraints and the large source energy provided by explosive materials, explosive charges detonated in shot-holes provide a preferred source of seismic source energy. Shot holes up to four inches wide and between two and thirty meters deep are commonly drilled in surface geologic formations to allow placement of the explosives. The explosive charges are typically placed in the bottom of the shot-hole and are detonated to generate shock waves transmitted into the subsurface geologic formations.

Seismic shot-holes require different parameters than excavation blast holes because the objective of shot-holes is not to displace or fracture rock, but to efficiently transfer elastic shock wave energy downwardly into subsurface geologic formations. Accordingly, shot-hole equipment and drilling techniques are relatively specialized.

The diameter of conventional explosive charges is smaller than the shot-hole diameter to facilitate placement of the explosives into the lower shot-hole end. The resulting annulus between the explosive charge and the shot-hole wall often reduces the efficiency with which the shock wave energy is transmitted to the subsurface geologic formations. Because of this reduction in efficiency, one technique promotes the use of gaseous explosives to eliminate the void space between the explosive and the borehole wall. U.S. Pat. No. 3,752,256 to Mollere (1973) disclosed a method for positioning a combustion chamber within soil to generate seismic source energy. U.S. Pat. No. 3,976,161 to Carman (1976) disclosed an auger for inserting an explosive gas mixture into loose soil.

A large portion of the shock wave energy is discharged upwardly through the shot-hole because of the relatively low resistance provided by the open hole. To limit this energy loss, plugs are placed in the shot-hole as shown in U.S. Pat. No. 4,066,125 to Bassani (1978). U.S. Pat. No. 4,736,796 to Amall et al. (1988) disclosed other techniques for sealing shot-holes with cement, gravel, and bentonite.

Explosives have provided a seismic energy source since the inception of seismic exploration, however little effort has been committed to the performance of explosive materials. Obstacles to explosive evaluation include unavailability of information regarding the impact of certain explosive parameters, the lack of effective techniques for field testing such parameters, lack of techniques for evaluating field test data and the high cost of conducting the multi-variant experiments required to evaluate the explosives.

Various techniques have been developed to control the shape and directivity of seismic energy discharges. U.S. Pat. No. 3,908,789 to Itria (1975) disclosed a technique for controlling the explosive material length. Control over detonation of an explosive material was disclosed in U.S. Pat. No. 4,053,027 to Oswald (1977), wherein a first and second energy pulse was generated during the same seismic event. Numerous publications have addressed the mechanics of energy wave transmission through various soil conditions.

Regional seismic operations require multiple shothole locations for a seismic survey, and large surveys can require thousands of shotholes. The average cost for each shothole multiplied by the number of shotholes significantly determines the economic efficiency of the survey and the data sets obtainable from a survey design. Seismic exploration is expensive to conduct and adequate data quality is sometimes difficult to obtain in certain geologic conditions. Drilling depth and on-site personnel and equipment time are significant cost factors. Accordingly, a need exists for improved techniques for efficiently determining the source parameters for seismic shotholes in areas inaccessible by heavy equipment.

SUMMARY OF THE INVENTION

The present invention provides a method for selecting a seismic energy source for use in a selected seismic survey area. The method comprises the steps of assessing selected physical properties of soil within the seismic survey area, of testing reaction of the soil response to selected seismic energy source characteristics, of generating a test model of a selected seismic energy source initiation within the soil, of estimating the far-field seismic response model of said seismic energy source initiation from said near-surface test model, of conducting a seismic event within the selected seismic survey area to measure seismic data initiated by said seismic event, and of comparing said far-field seismic response model to the seismic data initiated by said seismic event

DESCRIPTION OF THE PREFERRED EMBODIMENTS

The invention provides a method for improving the quality of seismic data in geophysical operations. The method is performed by determining the physical characteristics of the geologic formations, of developing and testing an explosives model for the area, of calibrating the model against actual tests, and of utilizing the model to conduct detailed explosive parameter testing.

Figure 1:
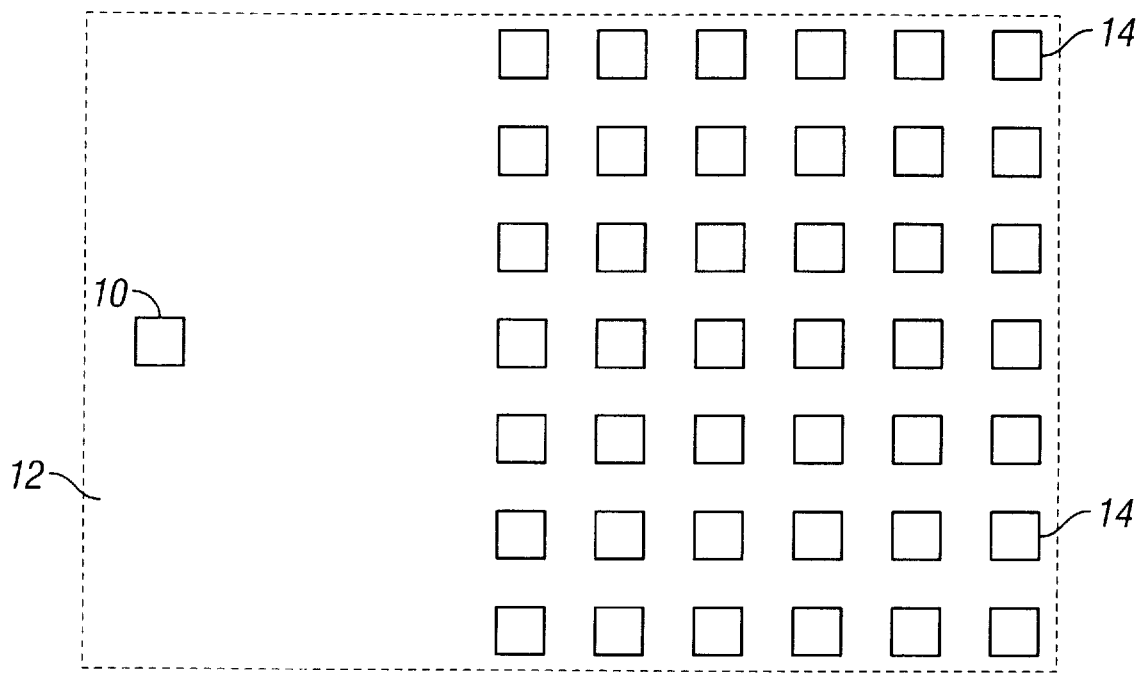
FIG. 1 illustrates a schematic diagram of a seismic survey area.

FIG. 1 illustrates a representative diagram for a seismic survey area. Source 10 is initiated to transmit seismic source energy into soil 12, and geophones 14 record reflected seismic source energy for future processing. Multiple shots are typically conducted within a selected survey area boundary of geologic interest.

After the boundaries of a survey area are identified, such area is examined to determine relevant characteristics of the shallow and deep geologic formations within such survey area. The surface or near surface geologic formations are assessed (at 20, in FIG. 2) to select representative test sites based on characteristics such as rock or soil type, moisture characteristics, degree and depth of weathering, and other factors. Core samples are taken at each test site and the core samples are analyzed to determine porosity, density, compressional and shear wave velocities, elastic and dynamic moduli, and stress-strain relationships under uni-axial and tri-axial pressures. As used herein, the term "soil" includes aggregates, sediments, rock, organic material, sand, and other materials comprising the Earth surface.

Following these determinations of rock or soil type, experiments are designed and conducted to test (at 22, in FIG. 2) the performance of different explosive types at the survey test sites. Different types of explosive charges are discharged at each test site and the results are detected with an array of geophones. Such geophones preferably comprise three component geophones. Various parameters of the explosive charges are evaluated during such tests, including the velocity of detonation, density, charge diameter relative to hole diameter, impedance of the explosion reaction products relative to the impedance of the surrounding rock or soil, charge shape, charge length, gas generation, energy release time, tamping material, total energy, shock energy, gas or bubble energy, and other parameters.

The geophone data is processed with analysis routines to determine which combination of explosive parameters yielded the optimum data quality. Such processing includes spectral analysis to determine the relative amplitude of the signal and noise energy over selected frequency ranges. Such analysis routines are conducted for each explosive shot for each test site. The spectra from such spectral analysis are averaged at selected frequencies to create a composite spectrum for each explosive charge type, and the range of deviation and average deviation from the composite spectra is calculated at selected frequencies across the bandwidth of interest. Individual and composite spectra from each explosive charge type are compared individually and in different combinations to determine the effect of each parameter within the bandwidth of interest. Parameters producing desired results are identified, and such parameters can be subjected to sensitivity analysis with various modeling methodology. Desirable parameters include increased signal energy, increased signal-to-noise ratio, increased signal consistency, and decreased noise.

Accurate explosive modeling (at 24, in FIG. 2) is conducted by preparing a two or three dimensional model of the formation and of the explosive charges. Near surface formation parameters characterizing geologic formation conditions proximate to the explosive charges are derived from core sample measurements, well logs, and test data. Such parameters can include but are not limited to porosity, density, compressional and shear wave velocities, elastic and dynamic moduli, and stress-strain relationships under uni-axial and tri-axial pressures.

Predictions regarding the deep geologic formations are performed so that particle velocities and displacements can be modeled. The deeper formations may not be cored, and information regarding such formations may be derived from prior seismic data, well logs, or published data. The model is extended vertically to the maximum depth of interest and laterally to the maximum offset of interest. Lateral variations in geologic formation parameters may or may not be incorporated into the model depending upon availability of information and model accuracy sought. Depending upon the modeling codes used, dispersion or anisotropy effects may be incorporated within the model.

The model for the explosive charges consists of equations of state for the specific explosives tested. Such equations of state can be determined from cylinder expansion or bubble test data or from published values.

Figure 2:
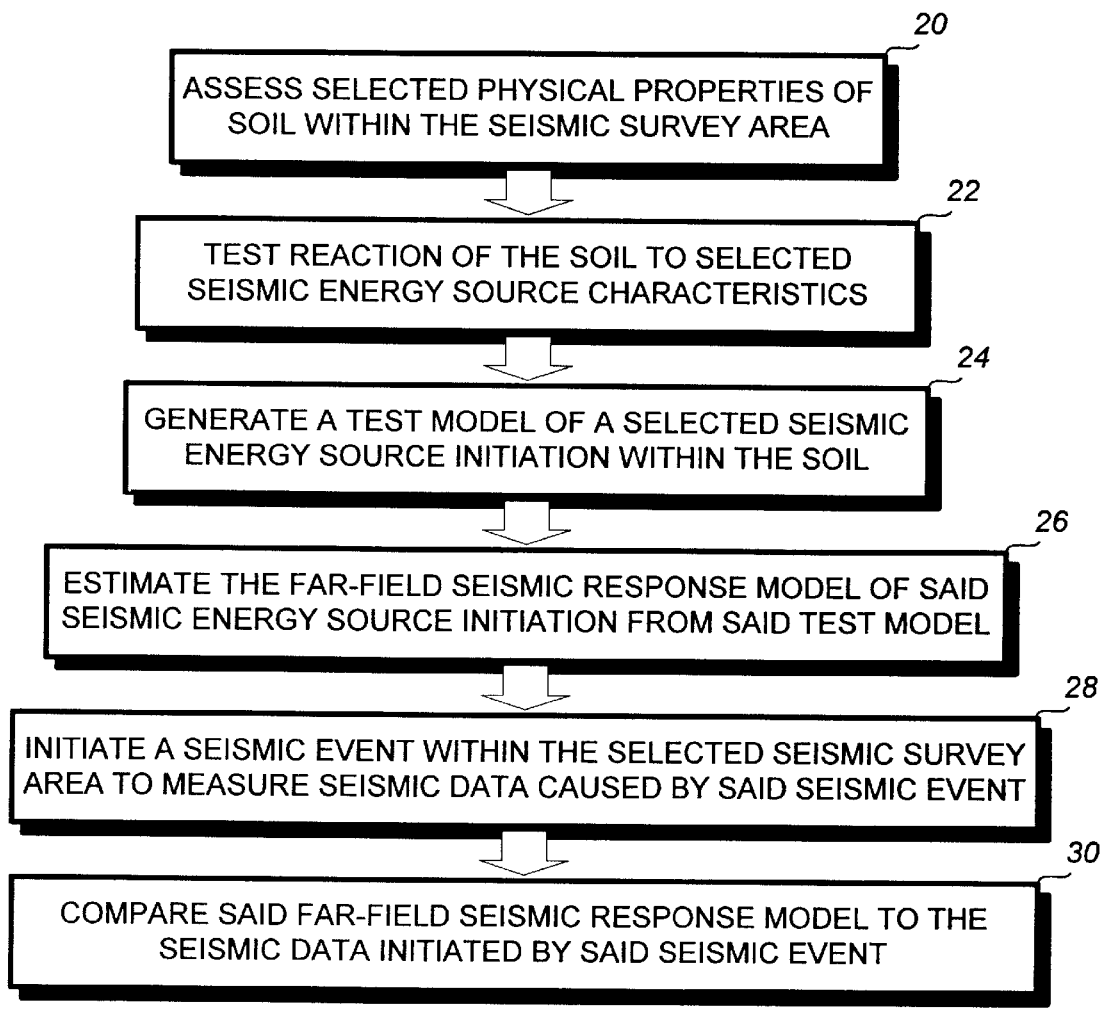
FIG. 2 illustrates one embodiment of a method practiced in accordance with the present invention.

Following formation of a model, numerical simulation of specific explosive charge types is initiated (at 26, FIG. 2). Langrangian or Eulerian hydrodynamic codes can simulate explosion of each specific charge type within the near surface configuration, and approximating the seismic source geometry proposed. The explosion progress and the response of surrounding rock or soil are simulated at discrete time intervals throughout the explosive charge detonation. Depending upon the type of waves or Earth configuration being modeled, such calculations may be performed in two or three dimensions. Such simulations are computationally intensive and may require multiple steps. A boundary within the rock is selected around the explosive charge. When the energy from an explosive charge reaches the selected boundary the magnitude and direction of the particle motion at each cell along the boundary is recorded and is used as input to a more extensive model. This process is continued until the range of particle motion is small enough to suggest elastic response of the rock. At this point the particle motion values are taken and are reinserted into another modeling program capable of extending the elastic response calculations to a distance approximating the larges geophone offsets to be recorded during the seismic survey.

A seismic event is initiated within the selected seismic survey area to measure seismic data caused by the seismic event (at 28, FIG. 2). The final results are displayed as a series of graphs or traces representing a synthetic version of the parameter tests. These synthetic traces are compared (at 30, FIG. 2) to the actual traces (parameter test data) for some combination of the explosive formulations tested. If the synthetic and actual data match within an acceptable bound, the test area model is calibrated.

The evaluation metrics include the presence of observed test data, the times of specific events in the record, the relative amplitudes of the events with depth and offset, and the noise characteristics in the data. If the synthetic traces and actual traces do not match within an acceptable bound, the model parameters are adjusted and the model is run again. This process is continued iteratively until the synthetic and actual data match within an acceptable bound.

After a test model area has been calibrated, sensitivity tests for the explosive parameters can be conducted. Sensitivity tests are conducted by varying a single parameter and re-running the model to determine the parameter change required to produce a certain change in the simulated seismic data. Such tests can be repeated for various magnitudes and directions of change for a single parameter until the data sensitivity to such parameter is identified. Sensitivity tests can be repeated for other parameters until the relative importance of each parameter is known.

From this analysis of the relative importance of explosive charge parameters and the corresponding sensitivity of each parameter, predictions for the improvement of explosive material and configuration can be made to improve data quality or the efficiency of shot operation. Multiple combinations of parameters can be evaluated without requiring additional field tests. By comparing model results to other model results or to actual test data, estimates for the optimum set of parameters can be determined. Predictions for the performance of various explosive or propellant type energy sources can be made, and new explosive formulations can be evaluated. For example, explosive compositions can be varied to change the explosive density or detonation velocity, to match explosive byproduct impedance to the surrounding rock, to alter the energy release time, to change the total charge energy, or to change the partitioning of the total energy between shock and gas energy. Moreover, new explosive forms can be modelled, including changes to the length, shape, and phase (whether liquid, gas, gel, solid, particulate, or composite) of explosives or propellants.

Additionally, the present invention permits predictions regarding the near-surface soil response to seismic energy sources at different elevations within the soil. These predictions are extremely useful in reducing the shot hole depth necessary to accomplish desired seismic energy coupling. By modeling such responses with the calibrated test model, calculated predictions can be made to compare additional drilling costs for deeper shot holes against the potential savings in reduced energy charges. Economic predictions can be made in view of local issues such as environmental sensitivities, boundary zones between land and water, and changes in acoustic energy source capabilities. The invention facilitates survey strategies regarding parameters such as charge size, type and shape, depth-of-burial, tamping, rock or soil type, and other variables.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A method for selecting a seismic energy source for use in a selected seismic survey area, comprising the steps of:
   assessing selected physical properties of soil within the seismic survey area;
   testing reaction of the soil to selected seismic energy source characteristics;
   generating a test model of a selected seismic energy source initiation within the soil;
   estimating the far-field seismic response model of said seismic energy source initiation from said test model;
   initiating a seismic event within the selected seismic survey area to measure seismic data caused by said seismic event; and
   comparing said far-field seismic response model to the seismic data initiated by said seismic event.

2. A method as recited in claim 1, further comprising the step of utilizing said far-field seismic response model to test charge and shot hole configuration and geometry.

3. A method as recited in claim 1, further comprising the step of utilizing said far-field seismic response model to optimize charge and shot hole configuration and geometry.

4. A method as recited in claim 1, further comprising the step of initiating additional seismic events within the selected seismic survey area while varying selected seismic energy source parameters.

5. A method as recited in claim 4, further comprising the step of comparing such additional seismic data against said far-field response model.

6. A method as recited in claim 1, further comprising the step of evaluating the deviation of said far-field seismic response model from the seismic data initiated by said seismic event.

7. A method as recited in claim 1, further comprising the step of evaluating the sensitivity of a selected seismic energy source characteristic to the seismic data initiated by said seismic event.

8. A method as recited in claim 7, further comprising the step of comparing the relative sensitivity between at least two selected seismic energy source characteristics.

9. A method as recited in claim 1, further comprising the step of selecting a seismic energy source for use in the selected seismic survey area.

10. A method as recited in claim 1, further comprising the step of modifying said test model to correlate said test model with the seismic data initiated by the seismic event.

11. A method as recited in claim 10, further comprising the steps of initiating an additional seismic event, of recording seismic data initiated by such seismic event, and of comparing said modified test model with said recorded seismic data.

12. A method for evaluating effectiveness of a seismic energy source use in a selected seismic survey area, comprising the steps of:
    removing a sample from the soil;
    assessing selected physical properties of said sample;
    testing reaction of said sample response to selected seismic energy source characteristics;
    generating a test model of a selected seismic energy source initiation within the sample; and
    estimating the far-field seismic response model of said seismic energy source initiation from said test model.

13. A method as recited in claim 12, further comprising the step of utilizing said test model to conduct simulations optimising charge and shot hole configuration and geometry.

14. A method as recited in claim 12, further comprising the step of initiating a seismic event within the selected seismic survey area to measure seismic data initiated by said seismic event.

15. A method as recited in claim 14, further comprising the step of comparing said far-field seismic response model to the seismic data initiated by said seismic event.

16. A method as recited in claim 12, further comprising the step of estimating the far-field seismic response of a plurality of seismic energy sources.

17. A method as recited in claim 15, further comprising the step of selecting one of said seismic energy sources based on a selected criteria in said estimated far-field seismic response.

18. A method for optimising the source energy necessary to image and evaluate subsurface geologic formations within a selected seismic survey area, comprising the steps of:
    removing a plurality of samples from the soil;
    assessing selected physical properties of each soil sample;
    testing reaction of each sample response to selected seismic energy source characteristics;
    generating a test model of a selected seismic energy source initiation within the near-surface soil samples;
    identifying characteristics regarding the subsurface geologic formations;
    estimating the far-field seismic response model of said seismic energy source initiation from said near-surface test model;
    initiating a seismic event within the selected seismic survey area to measure seismic data initiated by said seismic event; and
    comparing said far-field seismic response model to the seismic data initiated by said seismic event.

19. A method as recited in claim 18, further comprising the step of using the far-field seismic response model to identify a seismic energy source providing a selected far-field seismic response in the selected seismic survey area.

20. A method as recited in claim 19, further comprising the step of initiating a plurality of seismic energy sources, of the type identified by the far-field seismic response model, within the selected survey area.

* * * * *